UNITED STATES PATENT OFFICE.

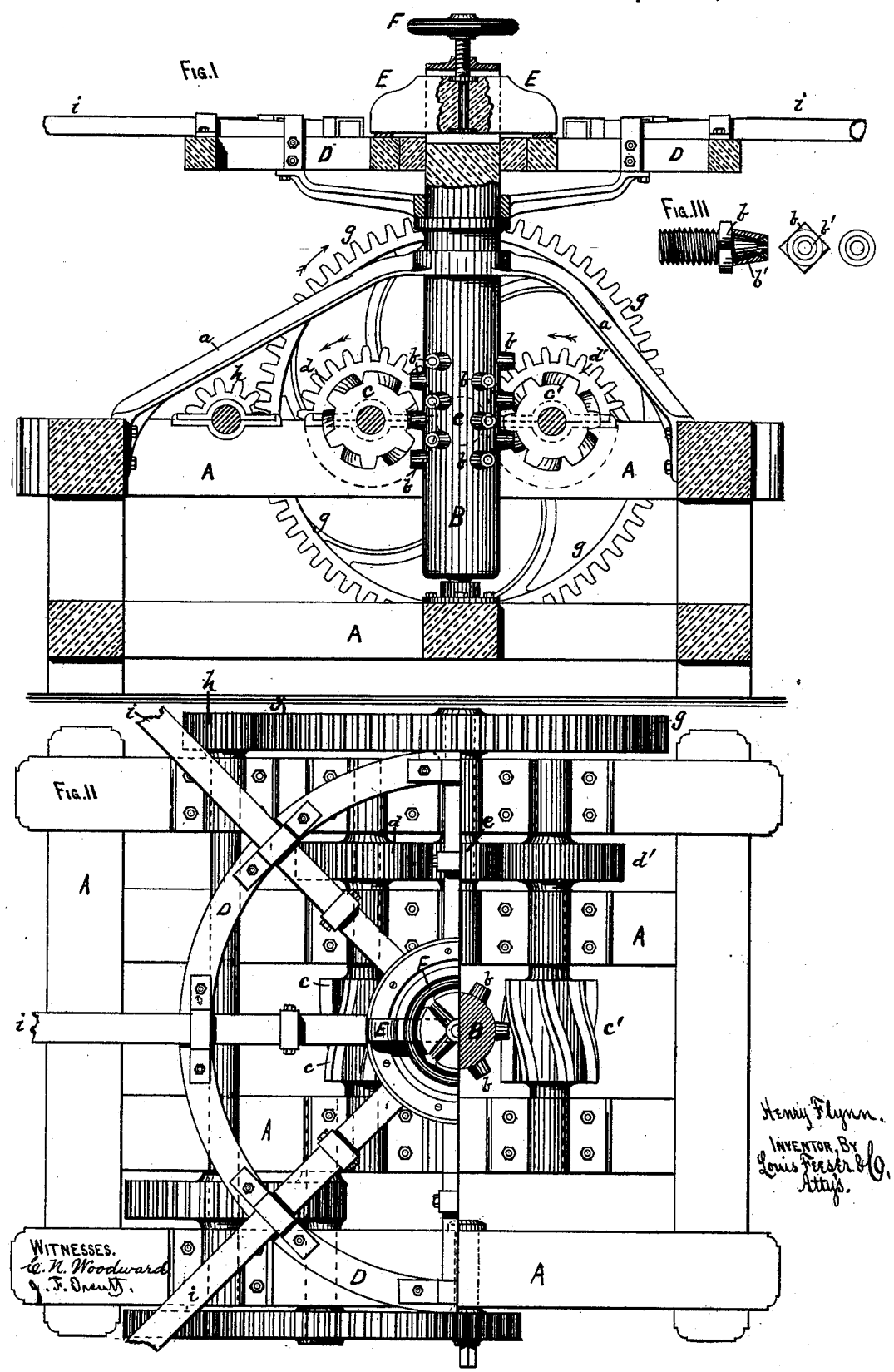

HENRY FLYNN, OF MINNEAPOLIS, MINNESOTA.

IMPROVEMENT IN HORSE-POWERS.

Specification forming part of Letters Patent No. 219,706, dated September 16, 1879; application filed December 18, 1878.

*To all whom it may concern:*

Be it known that I, HENRY FLYNN, of Minneapolis, in the county of Hennepin and State of Minnesota, have invented certain new and useful Improvements in Horse-Powers, which improvements are fully set forth in the following specification and accompanying drawings, in which—

Figure 1 is a sectional side elevation. Fig. 2 is a semi-sectional plan view, and Fig. 3 is an enlarged detail view of one of the operating-pins detached.

This invention relates to that class denominated "horse-powers;" and consists of a post or shaft provided with a series of studs or pins (having friction-rollers) arranged thereon in a serpentine or screw form, and adapted to act upon two or more angular-toothed gear-wheels, which in turn are connected by a system of gears and pinions to the "tumbling-rod" or other apparatus to which it is desired to apply the power, as hereinafter set forth.

A is the frame, in which a post, B, is "stepped," and supported by a brace, $a$. $b\ b$ are a series of studs or pins set into the post B in a spiral or screw form, and adapted to act upon the teeth of two or more gears, $c\ c'$. The teeth of these gears will be inclined so that when the pins $b$ strike them the latter, moving in a plane, will act upon these inclined teeth, and thus cause the gears to revolve.

$d\ d'$ are two gear-wheels upon the same shafts as the wheels $c\ c'$, and both arranged to mesh into one common pinion, $e$.

The gears $c\ c'$ will be made with the slant of their teeth in opposite directions, so that they will cause the gears $d\ d'$ to revolve in the same direction, and thus both act upon the pinion $e$ at the same time.

Another advantage gained by slanting the teeth of the gears $c\ c'$ in opposite directions is, that they thus serve to support the post B both from above and below, and relieve it from all end-strain.

$g$ is a large gear-wheel upon the shaft of the pinion $e$, and arranged to mesh into a pinion, $h$, and so on through any desired number of gears, until the required speed is obtained.

D is a wheel or frame, provided with the poles $i$, to which the horses are attached, and is mounted loosely upon the post B, so that it can be revolved independently of it.

E is a bar passing through a slot in the head of the post B, and adapted to be screwed down upon the wheel D, or raised from it, by a hand-wheel and screw, F, and thus act as a brake to release the wheel from the post or connect it thereto.

By this means the wheel D may be thrown out of gear from the transmitting mechanism instantly, and without stopping the horses, or the horses may be started before the brake is applied, and then, the latter being gradually set down, there will be little or no strain upon the horses or machinery when starting.

This is a very desirable and important feature of my invention, as it prevents, in a very large degree, accidents to and disarrangement of the mechanism.

This brake may be arranged in any desired form to accomplish the same result—viz., to instantly disconnect the wheel or head to which the horses are hitched from the transmitting mechanism.

The studs or pins $b$ will be provided with friction-rollers (see Fig. 3) made conical both inside and out, and mounted upon a tapered stud, $b'$, which will be screwed into or otherwise secured to the post B.

By tapering the studs upon which the rollers are mounted I obtain the greatest strength at the point where the most strain occurs—viz., next to the post B—and consequently there will be less danger of breakage.

By the arrangement of the studded post and inclined toothed gears I obtain a very great advantage in the point of power, as the long inclines of the teeth will enable me to revolve them with less power than where the ordinary gears are used. They are somewhat on the principle of the worm-gear.

An additional advantage may be gained by forming the gears $c\ c'$ concaved, so that they will partially enwrap the post B, thereby enabling the studs $b$ to remain a longer time in contact with the teeth, and increase their effect.

Having thus described my invention, what I claim as new, and desire to secure by Letters Patent, is—

1. The combination and arrangement of the post B, provided with the studs $b$, and the angular gear or gears $c$ $c'$, substantially as and for the purpose hereinbefore set forth.

2. The combination and arrangement of the post B, provided with the studs $b$, the angular gear or gears $c$ $c'$, and the gears $d$ $d'$, and pinion $e$, substantially as hereinbefore set forth.

In testimony whereof I have hereunto set my hand in the presence of two subscribing witnesses.

HENRY FLYNN.

Witnesses:
 C. N. WOODWARD,
 LOUIS FEESER.